United States Patent
Jeong et al.

(10) Patent No.: US 8,787,231 B2
(45) Date of Patent: Jul. 22, 2014

(54) METHOD AND APPARATUS FOR SAVING POWER OF USER EQUIPMENT IN WIRELESS COMMUNICATION SYSTEM

(75) Inventors: Kyeongin Jeong, Suwon-si (KR); Soenghun Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 62 days.

(21) Appl. No.: 13/401,119

(22) Filed: Feb. 21, 2012

(65) Prior Publication Data
US 2012/0213137 A1 Aug. 23, 2012

Related U.S. Application Data

(60) Provisional application No. 61/444,844, filed on Feb. 21, 2011, provisional application No. 61/526,223, filed on Aug. 22, 2011.

(51) Int. Cl.
G08C 17/00 (2006.01)
H04B 1/38 (2006.01)
H04B 7/00 (2006.01)
H04W 52/02 (2009.01)

(52) U.S. Cl.
CPC ...... *H04W 52/0235* (2013.01); *H04W 52/0209* (2013.01); *H04W 52/02* (2013.01)
USPC ............ 370/311; 455/574; 455/522; 455/524

(58) Field of Classification Search
CPC .................... H04W 52/0235; H04W 52/0229; H04W 52/0225; H04W 52/0209; H04W 52/02; H04W 52/00
USPC ......... 370/329, 252, 311, 315, 203, 248, 255, 370/310, 312, 330; 455/444, 501, 517, 522, 455/524, 574

See application file for complete search history.

(56) References Cited

U.S. PATENT DOCUMENTS

| 7,925,291 B2 | 4/2011 | Anigstein et al. |
| 8,116,351 B2 | 2/2012 | Koo et al. |
| 2010/0056169 A1 * | 3/2010 | Koo et al. ............... 455/450 |
| 2010/0118747 A9 * | 5/2010 | Anigstein et al. ........... 370/310 |

FOREIGN PATENT DOCUMENTS

| KR | 10-2006-0069856 A | 6/2006 | |
| KR | 10-2006-0100363 A | 9/2006 | |
| WO | WO 2012/064265 | * 5/2012 | ............ H04W 24/10 |

* cited by examiner

Primary Examiner — Kwang B Yao
Assistant Examiner — Adam Duda
(74) Attorney, Agent, or Firm — Jefferson IP Law, LLP

(57) ABSTRACT

An apparatus and method for improved power saving in a User Equipment (UE) supporting enhanced Inter-Cell Interference Coordination/Time-domain ICIC (eICIC/Time-domain ICIC) are provided. The power saving method includes receiving control information including a reference pattern for a power saving mode from a base station, determining whether the terminal is configured to operate in the power saving mode, and determining, when the terminal is configured to operate in the power saving mode, whether to decode a downlink control channel according to the reference pattern.

18 Claims, 13 Drawing Sheets

METHOD AND APPARATUS FOR SAVING POWER OF USER EQUIPMENT IN WIRELESS COMMUNICATION SYSTEM

PRIORITY

This application claims the benefit under 35 U.S.C. §119 (e) of a U.S. Provisional application filed on Feb. 21, 2011 in the U.S. Patent and Trademark Office and assigned Ser. No. 61/444,844, and of a U.S. Provisional application filed on Aug. 22, 2011 in the U.S. Patent and Trademark Office and assigned Ser. No. 61/526,223, the entire disclosure of each of which is hereby incorporated by reference.

BACKGROUND OF THE INVENTION

1. Field of the Invention

The present invention relates to a power saving method for a User Equipment (UE) in a wireless communication system. More particularly, the present invention relates to a power saving method for a User Equipment (UE) supporting enhanced Inter-Cell Interference Coordination/Time-domain ICIC (eICIC/Time-domain ICIC) in a wireless communication system.

2. Description of the Related Art

Mobile communication systems were initially developed to provide a subscriber with voice communication services while the subscriber was on the move. With advances in communication and related technologies, mobile communication system have evolved to support high speed data communication services as well as the standard voice communication services.

Recently, as a next generation mobile communication system, Long Term Evolution (LTE) is being standardized by the 3rd Generation Partnership Project (3GPP). LTE is a technology designed to provide high speed packet-based communication of up to 100 Mbps. Unlike the standard voice service, most data services are allocated resources according to the amount of data to be transmitted and the condition of the channel. Accordingly, in a wireless communication system such as a cellular communication system, it is important to manage resource allocation based on the resource scheduled for data transmission, channel condition, and amount of data to be transmitted. This is a requirement even in the LTE system as a next generation mobile communication system, and the scheduler located at the enhanced Node B (eNB) manages and assigns radio resources. Recent studies are focused on the LTE-Advanced (LTE-A) for improving data rate with the adaptation of several new techniques of the legacy LTE system.

For such an advance in technology, Inter-Cell Interference Coordination (ICIC) is also evolving to enhanced ICIC (eICIC) or Time-domain ICIC. The eICIC/Time-domain ICIC is a technique to mitigate inter-cell interference by reducing transmit power in a cell causing interference or by muting data transmission in units of subframe.

A UE located in a corresponding cell can have an opportunity for channel measurement to maintain a radio link and transmit data in the corresponding subframe. This subframe is referred to as an Almost Blank Subframe (ABS) and appears in a predetermined pattern. That is, since interference causes reduction in the transmit power or stops data transmission in ABS, the UE located in the neighbor cell can perform various operations without interference from the interference-causing cell. With the use of ABS, the UE is restricted of serving cell and neighbor cell measurements and channel measurement for Channel Quality Information/Channel Status Information (CQI/CSI) report to the serving cell in units of subframe and thus the information on the subframe pattern per purpose is sent to the UE through Radio Resource Control (RRC) signaling. The eICIC/Time-domain ICIC is actively discussed to improve the power saving efficiency. Therefore, a need exists for an apparatus and a method for conserving power of the UE supporting the eICIC/Time-domain ICIC.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for saving power of a User Equipment (UE) supporting enhanced Inter-Cell Interference Coordination (eICIC)/Time-domain ICIC. In the system supporting eICIC/time domain ICIC technique, the UE operation for receiving/decoding Physical Dedicated Control CHannel (PDCCH) in a specific subframe is negated with reuse of pattern information, resulting improved power saving efficiency. In order to determine the subframes in which the PDCCH reception/decoding operation is skipped, the indication information on whether to apply the power saving mode and channel measurement report value/information on a specific channel of the UE that are provided from the evolved Node B (eNB) can be used along with the pattern information used in the eICIC/Time-domain ICIC.

In accordance with an aspect of the present invention, a power saving method of a terminal in a wireless communication system in which transmit power control is performed in unit of subframe is provided. The method includes receiving control information including a reference pattern for a power saving mode from a base station, determining whether the terminal is configured to operate in the power saving mode, and determining, when the terminal is configured to operate in the power saving mode, whether to decode a downlink control channel according to the reference pattern.

In accordance with another aspect of the present invention, a terminal of a wireless communication system in which transmits power of the terminal is control in unit of subframe is provided. The terminal includes a transceiver for transmitting and receiving signals respectively to and from a base station, and a power controller for controlling reception of control information including a reference pattern for a power saving mode from a base station, for determining whether the terminal is configured to operate in the power saving mode, and for determining, when the terminal is configured to operate in the power saving mode, whether to decode a downlink control channel according to the reference pattern.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the description is directed to a Long Term Evolution (LTE) or an LTE-Advanced (LTE-A) system, it will be understood by those skilled in the art that the present invention can be applied even to other communication systems having a similar technical background and channel format, with slight modifications, without departing from the spirit and scope of the present invention. For example, the subject matter of the present invention can be applied to multicarrier High Speed Packet Access (HSPA) supporting carrier aggregation.

An LTE system is configured with various types of cells. For example, a Closed Subscriber Group (CSG) cell is configured to provide normal service to a CSG member User Equipment (UE). Typically, the CSGs are deployed to provide services within a small service area such as a home and a small business. A pico cell is a service area having a small radius and deployed at a hot spot with high density.

Unlink a CSG cell that provides normal services to members, a pico cell provides services to the public. The CSG and pico cells have small service areas as compared to a macro cell, and multiple CSG cells or pico cells can be deployed within the service area of a macro cell. However, this, increases the probability of inter-cell interference among the macro cell and the CSG and/or pico cells.

Figure 1:
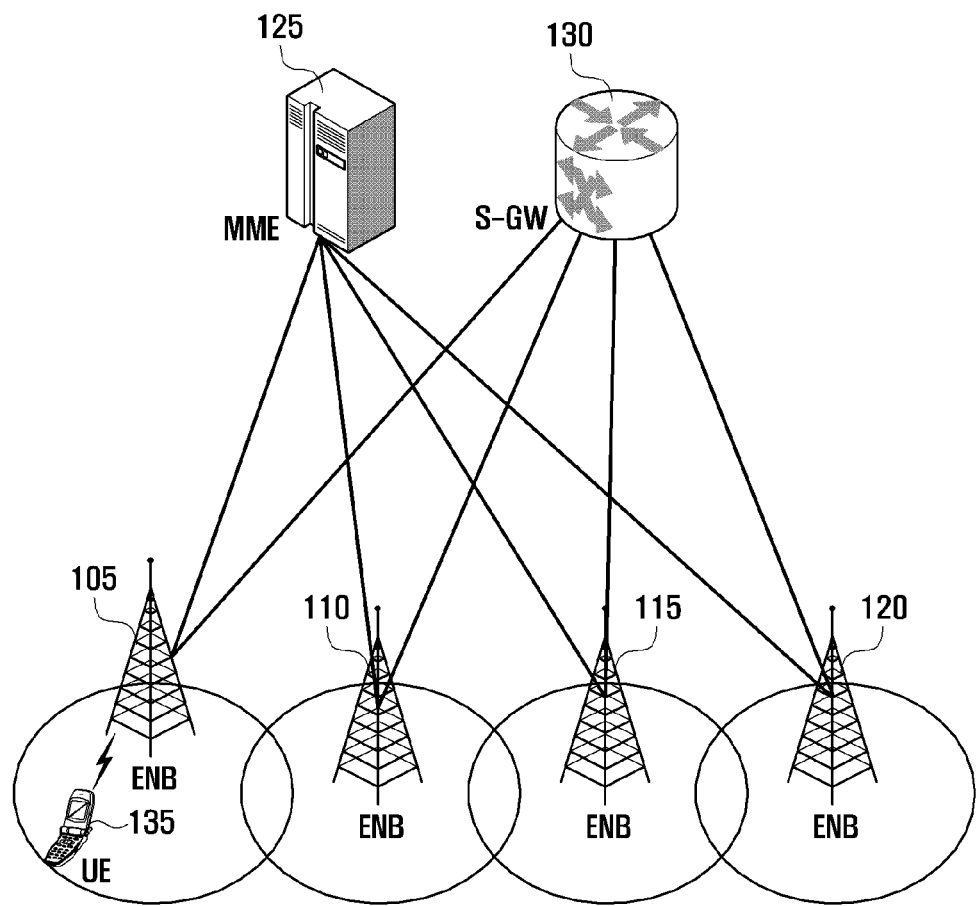
FIG. 1 is a diagram illustrating an architecture of a 3rd Generation Partnership Project (3GPP) Long Term Evolution (LTE) system according to an exemplary embodiment of the present invention.

FIG. 1 is a diagram illustrating an architecture of a 3rd Generation Partnership Project (3GPP) LTE system according to an exemplary embodiment of the present invention.

Referring to FIG. 1, the LTE system includes a plurality of evolved Node Bs (eNBs) 105, 110, 115 and 120, a Mobility Management Entity (MME) 125, and a Service-GateWay (S-GW) 130. Each of the eNBs 105, 110, 115 and 120, are provided with a communication connection to each of the MME 125 and the S-GW 130. Both the MME 125 and the S-GW 130 provide functions to the respective eNBs 105, 110, 115 and 120, such as forwarding and receiving packet data, control and execution of transmission/reception functions, and the like. In the example of FIG. 1, a UE 135 is provided in the service coverage area of eNB 105. As such, communication performed by the UE 135 is provided and controlled by the eNB 105. For example, resources for communication by the UE 135 are determined and provided by the eNB 105.

Figure 2:
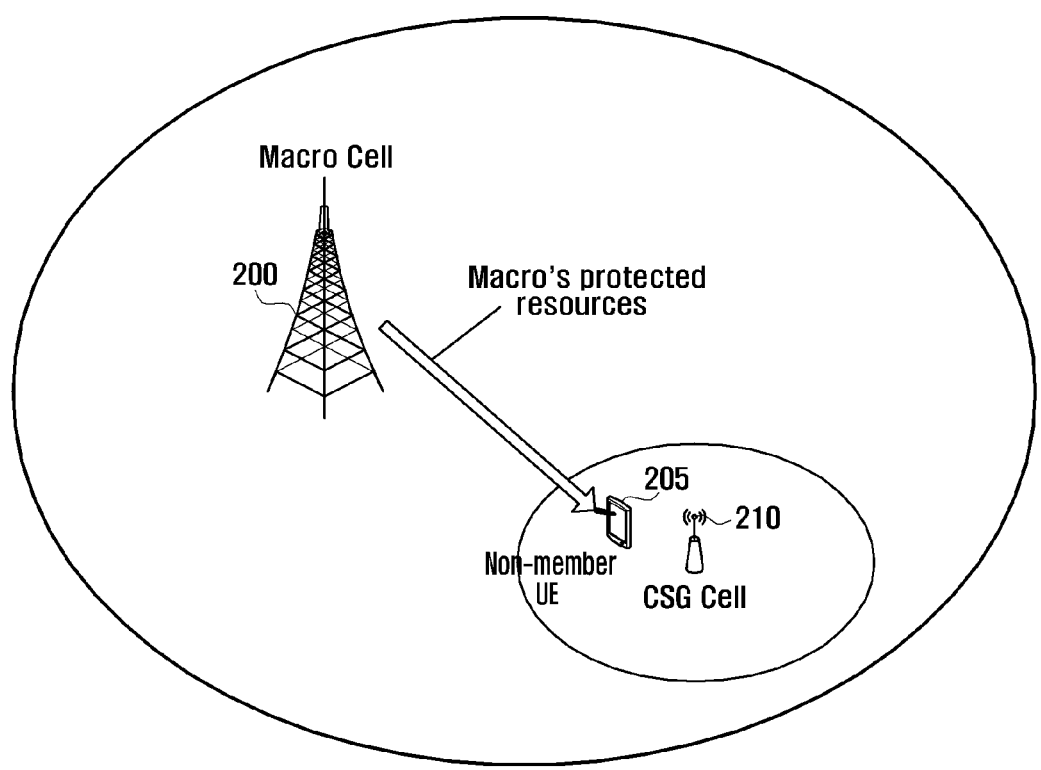
FIG. 2 is a diagram illustrating a scenario of interference between a macro cell and a Closed Subscriber Group (CSG) cell according to the related art.

FIG. 2 is a diagram illustrating a scenario of interference between a macro cell and a CSG cell according to the related art.

Referring to FIG. 2, a UE 205 is connected to and served by the macro eNB 200. It is assumed that the UE 205 moves to a CSG eNB 210. If the UE is not a member of the CSG cell, the downlink/uplink signals of the CSG cell cause strong interference to the UE 205 so as to hinder the communication with the macro eNB 200. In this scenario, the CSG cell is an aggressor cell and the macro cell is a victim cell.

Figure 3:
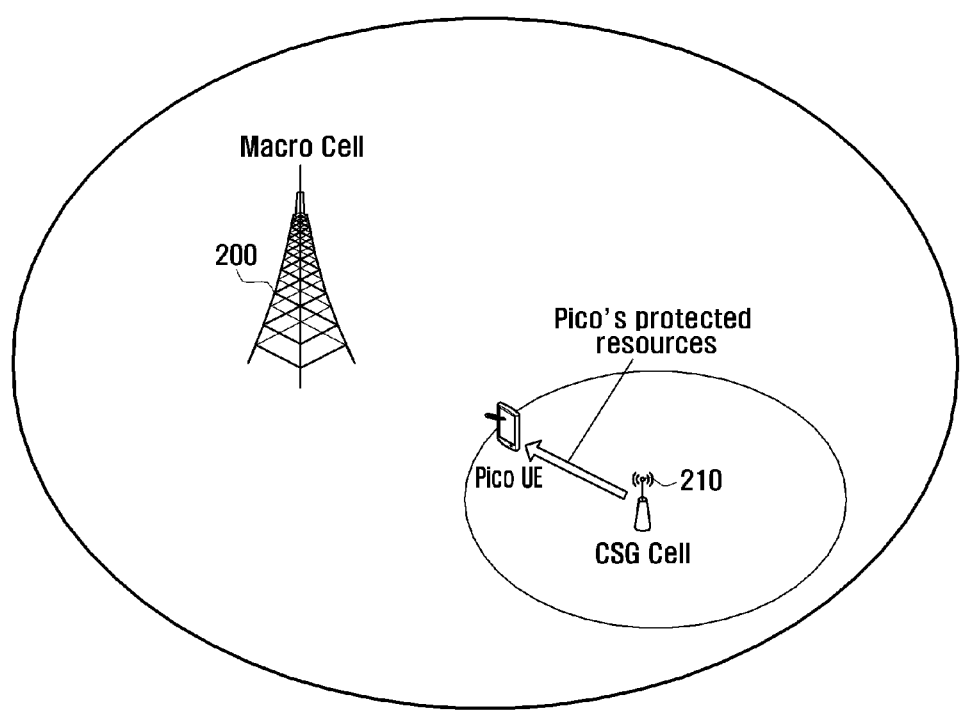
FIG. 3 is a diagram illustrating a scenario of interference between a macro cell and a pico cell according to the related art.

FIG. 3 is a diagram illustrating a scenario of interference between a macro cell and a pico cell according to the related art.

Referring to FIG. 3, a UE 305 is connected to and served by a pico eNB 310. It is assumed that the UE 305 moves in a direction towards a macro eNB 300 while remaining within the pico cell boundary. The downlink/uplink signal of the macro eNB 300 causes strong interference to the UE 305 so as to hinder the communication with the pico eNB 310. Although the interference from the macro cell can be mitigated by performing handover to the macro eNB 300, it may be intended for the pico cell to accommodate more users, resulting in the need of stable service provision to the UEs located at the pico cell boundary region. In this scenario, the macro cell is the aggressor cell and the pico cell is the victim cell.

The enhanced Inter-Cell Interference Coordination (eICIC)/Time-domain ICIC is a technique to reduce interference from an aggressor cell to a victim cell in such scenarios. The aggressor cell reduces the transmit power or mutes the data transmission in a pattern of subframes so as to mitigate the interference to the victim cell in the corresponding subframes. Meanwhile, the UE located in the victim cell performs channel estimation and maintains a radio link with the victim cell to exploit data transmission opportunities in the subframes in which the aggressor cell reduces the transmit power or mutes data transmission. Such a frame is referred to as an Almost Blank Subframe (ABS) and appears in a predetermined pattern.

Figure 4:
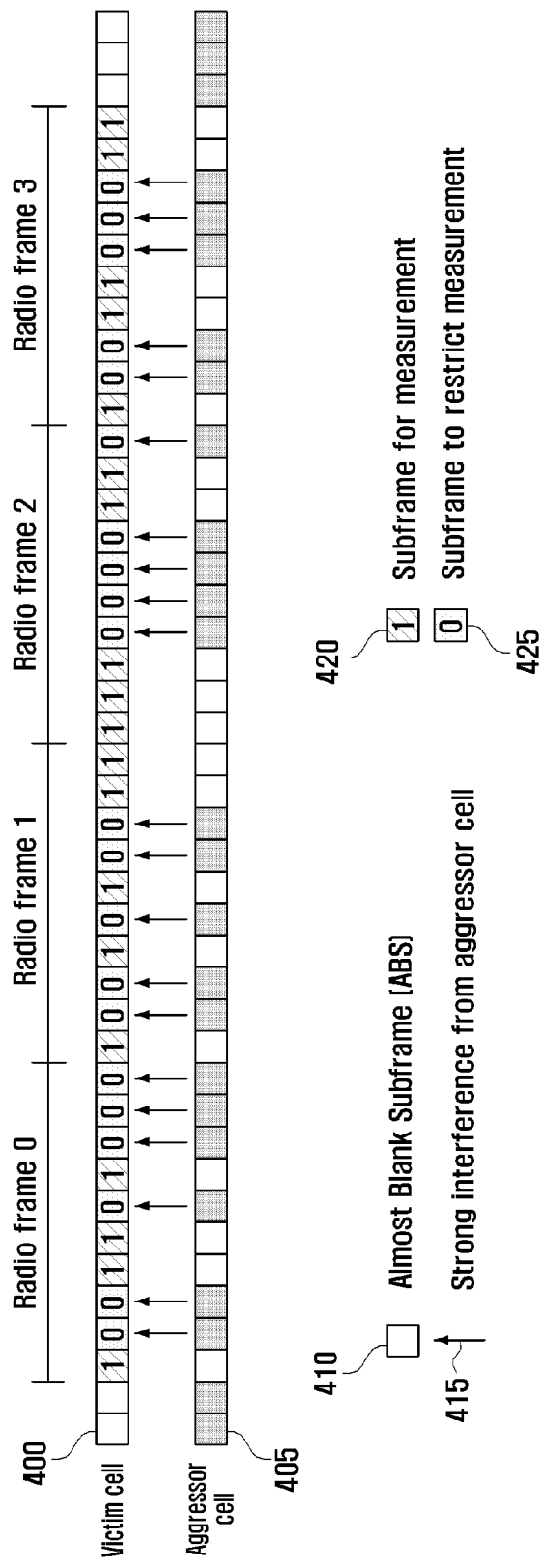
FIG. 4 is a diagram illustrating an Almost Blank Subframe (ABS) pattern for use in an enhanced Inter-Cell Interference Coordination (eICIC) technique according to an exemplary embodiment of the present invention.

FIG. 4 is a diagram illustrating an exemplary ABS pattern for use in an eICIC technique according to an exemplary embodiment of the present invention.

Referring to FIG. 4, reference number 400 denotes a pattern of subframes from the viewpoint of the victim cell, and reference number 405 denotes a pattern of subframes from the viewpoint of the aggressor cell. The subframe in which the aggressor cell reduces the transmit power or mutes data transmission is ABS and denoted by reference number 415. The other subframes are normal subframes for transmitting data based on a conventional power control mechanism.

The aggressor cell causes little or no interference to the victim cell in ABSs 410 but strong interference in normal subframes 415. The victim cell is restricted of the serving cell measurement, neighbor cell measurement, and channel measurement for Channel Quality Information/Channel Status Information (CQI/CSI) of the serving cell in units of subframe. The measurement-restricted subframe and measurement-allowed subframe are indicated by 0 and 1 in the pattern information of bitmap format, and the eNB notifies the UE of the information through a control signal (e.g. Radio Resource Control (RRC) signaling) such that the UE can perform cell/channel measurement in the subframe indicated by 1.

Assuming that the pattern depicted in FIG. 4 is of measurement restriction, the subframe 420 signaled with 1 is allowed for service cell measurement while the subframe 425 signaled with 0 is restricted against serving cell measurement (the serving cell measurement is not performed in the corresponding subframe). In Frequency Division Duplexing (FDD) mode, a 40-bit bitmap is used while in Time Division Duplexing (TDD) mode, the size of the bitmap is determined depending on the TDD configuration. A TDD configuration of 0 uses a 70-bit bitmap, TDD configurations 1-5 use a 20-bit bitmap, and a TDD configuration of 6 uses a 60-bit bitmap. There are two patterns for restricting channel measurement for CQI/CSI report. The UE has separate configurations for the two patterns and performs CQI/CSI reporting in association with the two patterns. The pattern information for restricting the serving cell measurement, the neighbor cell measurement, and the channel measurement for CQI/CSI can be signaled through higher layer signaling (i.e. RRC Connection Reconfiguration message) as shown in Tables 1-3.

TABLE 1

Pattern 1: For restricting the serving cell measurement

```
MeasSubframePatternPCell-r10 ::=           CHOICE {
release              NULL,
```

TABLE 1-continued

Pattern 1: For restricting the serving cell measurement

```
setup        MeasSubframePattern-r10
}
MeasSubframePattern-r10 ::= CHOICE {
    subframePatternFDD-r10        BIT STRING
                                  (SIZE (40)),
    subframePatternTDD-r10        CHOICE {
        subframeConfig1-5-r10         BIT STRING
                                      (SIZE (20)),
        subframeConfig0-r10           BIT STRING
                                      (SIZE (70)),
        subframeConfig6-r10           BIT STRING
                                      (SIZE (60)),
        ...
                                  }
                              }
```

TABLE 2

Pattern 2: For restricting neighbor cell measurement

```
MeasSubframePatternConfigNeigh-r10 ::=          CHOICE {
    release                           NULL,
    setup                             SEQUENCE {
        measSubframePatternNeigh-r10    MeasSubframePattern-r10,
        measSubframeCellList-r10        MeasSubframeCellList-r10    OPTIONA
                                  }
                              }
MeasSubframePattern-r10 ::= CHOICE {
    subframePatternFDD-r10        BIT STRING (SIZE (40)),
    subframePatternTDD-r10        CHOICE {
        subframeConfig1-5-r10         BIT STRING (SIZE (20)),
        subframeConfig0-r10           BIT STRING (SIZE (70)),
        subframeConfig6-r10           BIT STRING (SIZE (60)),
        ...
                                  }
                              }
```

TABLE 3

Pattern 3: for restricting channel measurement for CQI/CSI

```
csi-SubframePatternConfig-r10           CHOICE {
    release                              NULL,
    setup                                SEQUENCE {
/sub-pattern1/          csi-MeasSubframeSet1-r10    MeasSubframePattern-r10,
/sub-pattern2/          csi-MeasSubframeSet2-r10    MeasSubframePattern-r10
                                  }
                              }
MeasSubframePattern-r10 ::= CHOICE {
    subframePatternFDD-r10        BIT STRING (SIZE (40)),
    subframePatternTDD-r10        CHOICE {
        subframeConfig1-5-r10         BIT STRING (SIZE (20)),
        subframeConfig0-r10           BIT STRING (SIZE (70)),
        subframeConfig6-r10           BIT STRING (SIZE (60)),
        ...
                                  }
                              }
MeasSubframePattern-r10 ::= CHOICE {
    subframePatternFDD-r10        BIT STRING (SIZE (40)),
    subframePatternTDD-r10        CHOICE {
        subframeConfig1-5-r10         BIT STRING (SIZE (20)),
        subframeConfig0-r10           BIT STRING (SIZE
```

TABLE 3-continued

Pattern 3: for restricting channel measurement for CQI/CSI

| (70)), | | |
|---|---|---|
| | subframeConfig6-r10 | BIT STRING (SIZE |
| (60)), | | |
| | ... | |
| | | } |
| | } | |

Figure 5:
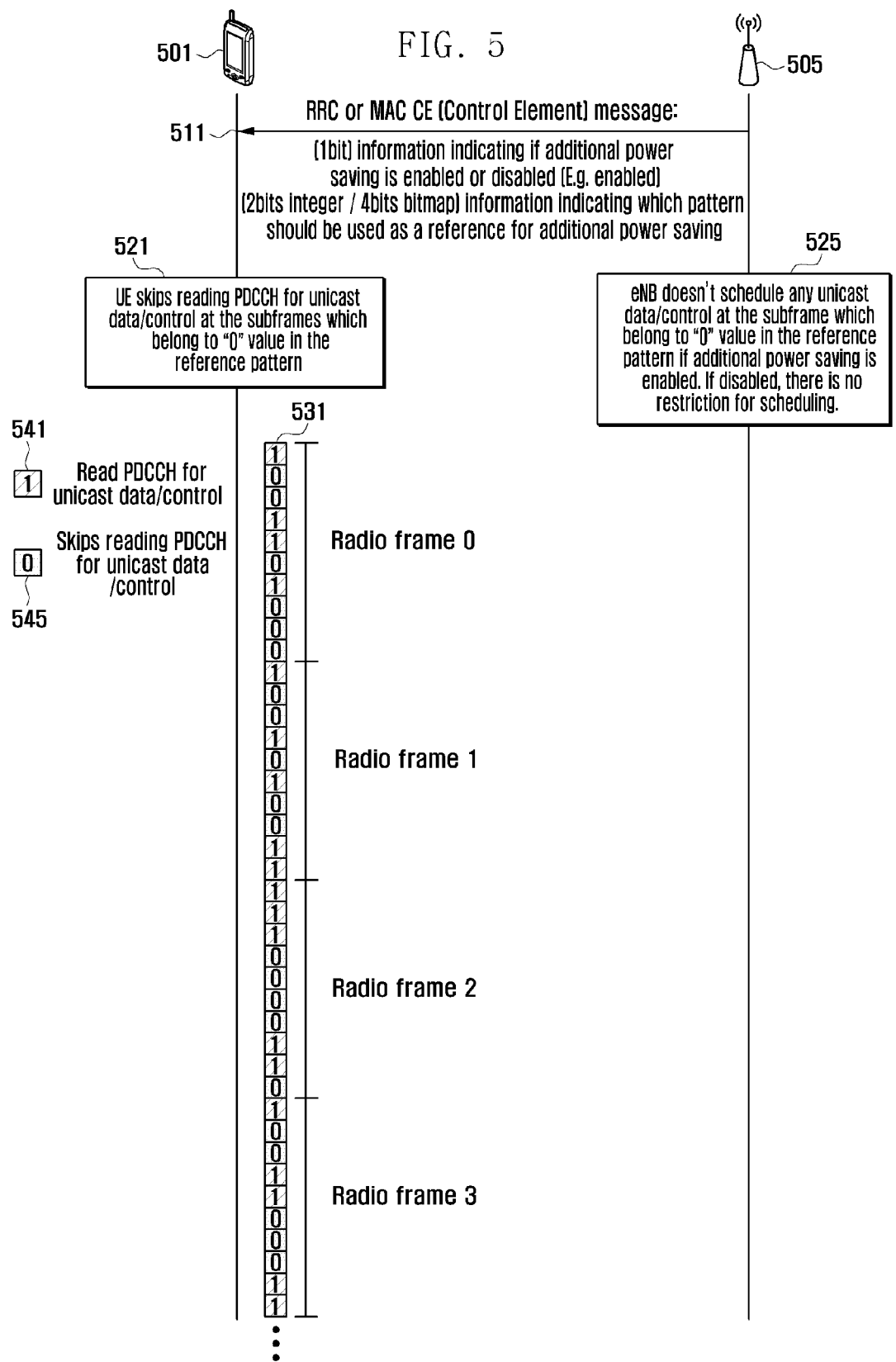
FIG. 5 is a signaling diagram illustrating a power saving method of a User Equipment (UE) in a Heterogeneous Network (HetNet) environment according to a first exemplary embodiment of the present invention.

FIG. 5 is a signaling diagram illustrating a power saving method of a UE in a Heterogeneous Network (HetNet) environment according to a first exemplary embodiment of the present invention.

Referring to FIG. 5, in the HetNet scenario, a serving eNB 505 transmits to a UE 501 control information including power saving mode operation instruction information and reference pattern information for the UE's power saving mode through an RRC layer control message (e.g. RRC Connection Reconfiguration message) or Medium Access Control (MAC) layer Control Element (CE) message. In more detail, the eNB 505 transmits to the UE 501 the information indicating if additional power saving is enabled or disabled and, if additional power saving is enabled, the information indicating which pattern should be used as a reference for additional power saving at step 511.

The information indicating that the additional power saving is enabled can be signaled using a 1 bit indicator (e.g., set to 1 for enabling the additional power saving mode and 0 for disabling the additional power saving mode, or vice versa).

The information indicating which pattern should be used as a reference for additional power saving can be signaled using a 2-bit integer value or a 4-bit bitmap (in case of a 2-bit integer value, "00" is mapped to pattern 1, "01" to pattern 2, "10" to sub-pattern 1 of pattern 3, and "11" to sub-pattern of pattern 3; and in case of 4-bit bitmap, the four bits, from the Most Significant Bit (MSB), are mapped to pattern 1, pattern 2, sub-pattern 1 of pattern 3, and sub-pattern 2 of pattern 3 in sequence, the pattern information corresponding to the bit set to 1 being used as a reference pattern of the additional power saving mode, e.g. "0010" indicates that the sub-pattern 1 of pattern 3 which is mapped to the third bit set to 1 is used as reference pattern, the bit-pattern mapping can be changed or interpreted differently).

In case that multiple patterns are used as reference patterns for the additional power saving mode, it is preferred to use the bitmap format. The information indicating which pattern should be used as a reference for additional power saving can be omitted at step 511 and, in this case, the pattern to be used is determined according to the standard.

If the RRC or MAC CE message received at step 511 indicates enabling the additional power saving mode, the UE 501 skips receiving/decoding Physical Dedicated Control Channel (PDCCH) for transmitting/receiving unicast data/control information at the subframe mapped to "0" in the reference pattern 521. In contrast, the UE 501 performs receiving/decoding on the PDCCH channel for unicast data/control information at the subframe mapped to "1" in the reference pattern.

For example, if the information signaled by the eNB 505 indicates enabling the additional power saving mode and using the sub-pattern 1 of pattern 3 as the reference pattern as denoted by reference number 531, the UE performs receiving/decoding PDCCH for transmitting/receiving unicast data/control information on the subframes 541 mapped to "1" in the pattern 531 and skips receiving/decoding PDCCH for transmitting/receiving unicast data/control information on the subframes 545 mapped to "0" in the pattern 531.

By skipping the PDCCH channel reception/decoding operation at the subframe mapped to "0" in the pattern, the UE can save energy. If the UE 501 has received the RRC or MAC CE message indicating enablement of the additional power saving mode, the eNB 505 does not schedule any unicast data/control information at the subframes mapped to "0" in the reference pattern at step 525.

Figure 6:
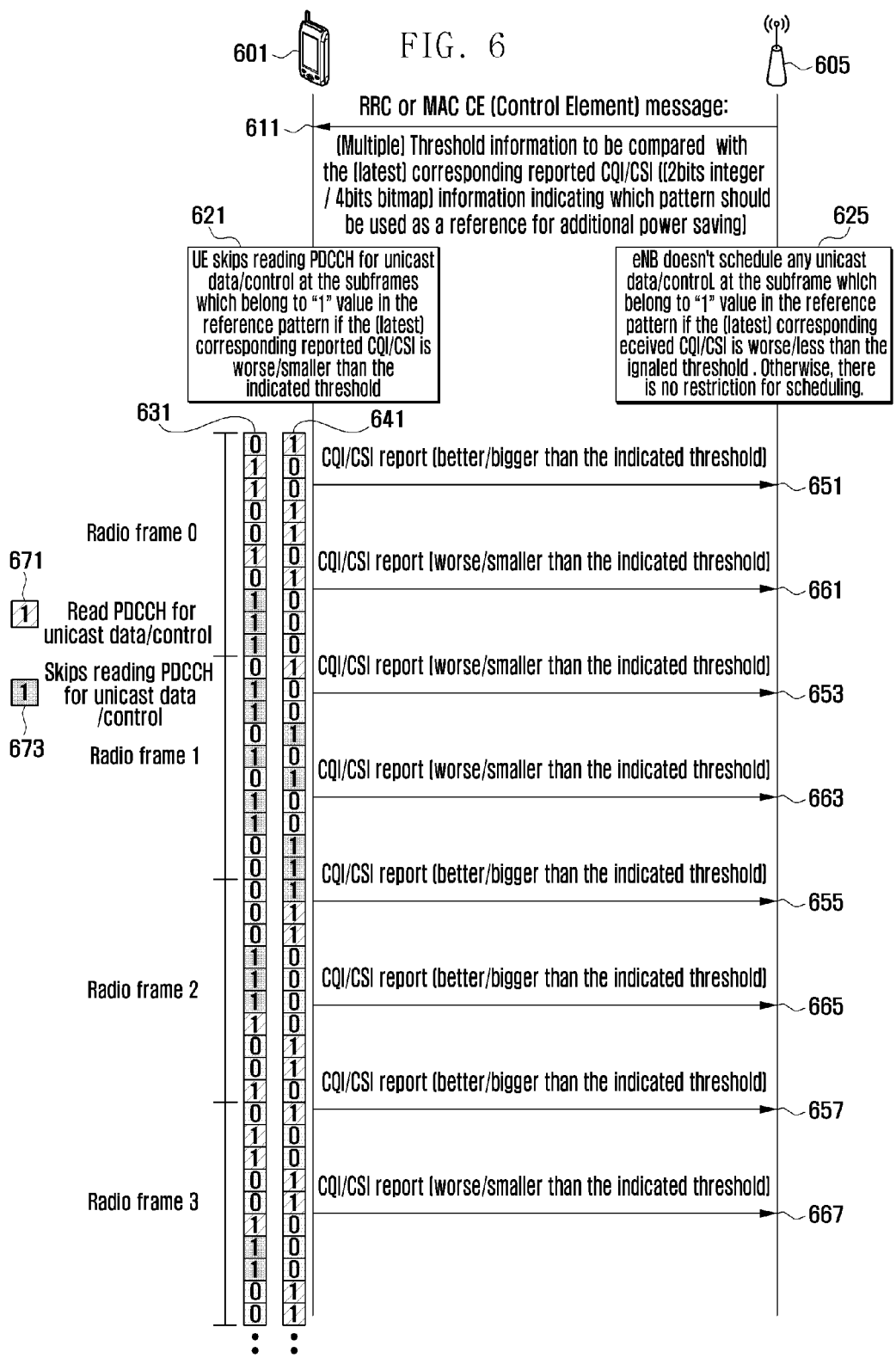
FIG. 6 is a signaling diagram illustrating a power saving method of a UE in a HetNet environment according to a second exemplary embodiment of the present invention.

FIG. 6 is a signaling diagram illustrating a power saving method of a UE in a HetNet environment according to a second exemplary embodiment of the present invention.

Referring to FIG. 6, in the HetNet scenario, the serving eNB 605 transmits to the UE 601 a control information message including at least one threshold value and reference pattern of the UE's power saving mode. In more detail, the eNB 605 transmits to the UE 601 information of one or multiple thresholds to be compared with the (latest) corresponding reported CQI/CSI and, if the information indicating enablement of additional power saving mode is signaled (i.e. the UE's additional power saving mode is enabled), the information indicating which pattern should be used as a reference for additional power saving among the patterns described with reference to FIG. 4 through an RRC message or MAC CE message at step 611.

The UE 601 compares the channel measurement value with the received threshold value(s) and, according to the comparison result, determines to perform receiving/decoding PDCCH for unicast data/control information at the subframe mapped to "1" of the corresponding reference pattern (e.g., if a measurement value of a specific channel is less than the threshold value, the UE skips receiving/decoding PDCCH for the unicast data/control information at the subframe mapped to "1" in the reference pattern, or vice versa).

Although FIG. 6 is directed to the case where the specific channel measurement value of the UE is the CQI/CSI channel measurement value reported by the UE, other channel measurement values can be used in the present invention (e.g., Reference Signal Received Power (RSRP) value, Reference Signal Received Quality (RSRQ) of Common Reference Signal (CRS), Signal to Interference-plus-Noise Ratio (SINR) measured on other data/control channel, etc.). As described above, the eNB 605 can signal one or more threshold values to the UE. Here, the multiple threshold values are used for the multiple reference patterns of the additional power saving mode.

FIG. 6 is depicted under the assumption that the threshold values are transmitted for the CQI/CSI channel measurement values reported by the UE 601. The threshold value can be an N-bit integer value, and the information indicating the reference pattern to be used for the additional power saving mode can be signaled using a 2-bit integer or a 4-bit bitmap (in case of a 2-bit integer value, "00" is mapped to pattern 1, "01" to pattern 2, "10" to sub-pattern 1 of pattern 3, and "11" to sub-pattern of pattern 3; and in case of 4-bit bitmap, the four bits, from the Most Significant Bit (MSB), are mapped to pattern 1, pattern 2, sub-pattern 1 of pattern 3, and sub-pattern 2 of pattern 3 in sequence, the pattern information corresponding to the bit set to 1 being used as reference pattern of the additional power saving mode, e.g. "0010" indicates that the sub-pattern 1 of pattern 3 which is mapped to the third bit set to 1 is used as reference pattern, the bit-pattern mapping can be changed or interpreted differently). In case that multiple patterns are used as reference patterns for the additional power saving mode, it is preferred to use the bitmap format. The information indicating which pattern should be used as a reference for additional power saving can be omitted at step 611 and, in this case, the pattern to be used is determined according to the standard. For example, it can be defined that one or two channel measurement threshold values are transmitted at step 611 for the sub-patterns 1 and 2 of pattern 3 as the reference patterns of the additional power saving mode.

If only one channel measurement comparison threshold value is transmitted regardless of the number of reference patterns to be used, the channel measurement comparison threshold value is applied for all reference pattern(s). If multiple channel measurement comparison threshold values are transmitted, the threshold values should be mapped to the corresponding reference patterns implicitly by a predetermined rule (e.g., the rule mapping the first threshold to first signaled reference pattern and the second threshold value to the second signaled reference patter or the rule defining threshold value-reference pattern mappings in a certain order) or explicitly through signaling (which threshold value is mapped to which reference pattern).

If the RRC or MAC CE message is received at step 611, the UE 601 compares the CQI/CSI channel measurement report value with the channel measurement threshold value per reference pattern and determines whether to receive/decode PDCCH for the unicast data/control information.

In more detail, if the CQI/CSI channel measurement report value is less than (or equal to) the channel measurement comparison threshold value, the UE skips receiving/decoding PDCCH for unicast data/control information at the subframe mapped to "1" in the reference pattern at step 621. That is, the operation for receiving/decoding PDCCH for unicast data/control information at the subframe mapped to "1" in the reference pattern is performed only when the CQI/CSI channel measurement report value is greater than (or equal to) the channel measurement comparison threshold value of the reference pattern.

It is assumed that one channel measurement comparison threshold value is received with the explicit indication of sub-pattern 1 of pattern 3 as denoted by reference number 631 in which CQI/CSI reports are transmitted in sequence as denoted by reference numbers 651, 653, 655, and 657 and sub-pattern 2 of pattern 3 as denoted by reference number 641 in which CQI/CSI reports are transmitted in sequence as denoted by reference numbers 661, 663, 665, and 667. If the CQI/CSI measurement report value transmitted at step 651 is equal to or greater than the channel measurement comparison threshold value received at step 611, the UE performs receiving/decoding PDCCH for unicast data/control information at the subframe mapped to "1" in the pattern 631.

Meanwhile, if the CQI/CSI measurement report value transmitted at step 653 is less than the channel measurement comparison threshold value received at step 611, the UE 601 skips receiving/decoding PDCCH for unicast data/control information at the subframe mapped to "1" in the pattern 631.

If the CQI/CSI measurement report values transmitted at steps 655 and 657 are equal to or greater than the channel measurement comparison threshold value received at step 611, the UE 601 performs receiving/decoding PDCCH for unicast data/control information at the subframes mapped to "1" in the pattern 631 (before the next CQI/CSI report).

A description is made of the CQI/CSI report in the sub-pattern 2 of pattern 3 as denoted by reference number 641 herein. If the CQI/CSI measurement report values transmitted at steps 661 and 663 are less than the channel measurement comparison threshold value received at step 611, the UE 601 skips receiving/decoding PDCCH for unicast data/control information in the subframes mapped to "1" of the pattern 641 since steps 661 and 663 (before the next CQI/CSI reports).

If the CQI/CSI measurement report value transmitted at step 665 is equal to or greater than the channel measurement comparison threshold value received at step 611, the UE 601 performs receiving/decoding PDCCH for unicast data/control information in the subframes mapped to "1" of the pattern 641 since step 665 (before the next CQI/CSI report at step 667). If the CQI/CSI measurement report value transmitted at step 667 is less than the channel measurement comparison threshold value received at step 611, the UE 601 skips receiving/decoding PDCCH for unicast data/control information in the subframes mapped to "1" of the pattern 641 since step 667 (before the next CQI/CSI report).

Reference number 671 denotes the subframes mapped to "1" in the respective patterns at which the UE performs receiving/decoding PDCCH for unicast data/control information, and reference number 673 denotes the subframes mapped to "1" in the respective patterns at which the UE skips receiving/decoding PDCCH for unicast data/control information.

If the RRC or MAC CE message received at step 611 indicates enabling the additional power saving mode and if the CQI/CSI measurement report value transmitted by the UE 601 is less than the channel measurement comparison threshold value transmitted at step 611, the eNB skips scheduling unicast data/control information at the subframes mapped to "1" in the corresponding reference pattern since the CQI/CSI report (before the CQI/CSI report) at step 625.

Although the description is directed to the case where the start time point of performing/skipping the operation of receiving/decoding PDCCH for unicast data/control information according to the comparison result between the CQI/CSI measurement report value transmitted by the UE and the channel measurement comparison threshold value received from the eNB is the next subframe following the CQI/CSI measurement report subframe, the start time point can be determined after "x" subframes since the CQI/CSI measurement report subframe. In this case, "x" can be a value signaled explicitly by the serving eNB or defined fixedly in the standard.

Figure 7:
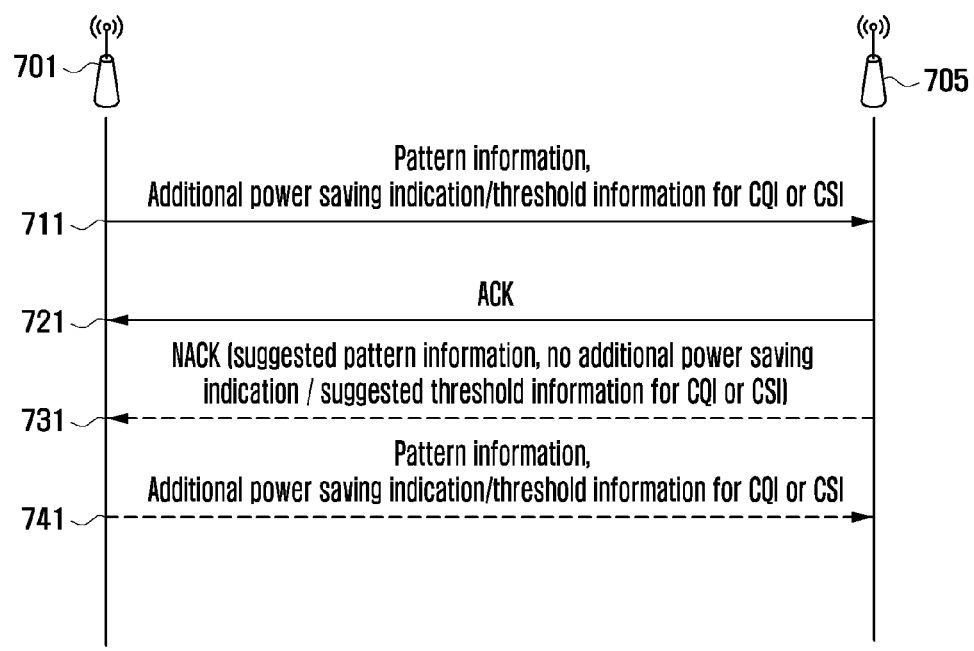
FIG. 7 is a signaling diagram illustrating a pattering information exchange between evolved Node Bs (eNBs) in the power saving method according to an exemplary embodiment of the present invention.

FIG. 7 is a signaling diagram illustrating a pattering information exchange between eNBs in a power saving method according to an exemplary embodiment of the present invention.

Referring to FIG. 7, reference number 701 denotes an eNB controlling a macro cell (hereinafter, referred to as macro eNB) and reference number 705 denotes an eNB controlling a CSG/pico cell (hereinafter, referred to as a CSG/pico eNB). However, the eNBs 701 and 705 can be the CSG/pico eNB and the macro eNB, respectively.

The macro eNB 701 first sends the CSG/pico eNB 705 the control information including reference pattern information for UE's power saving mode at step 711. In more detail, the macro eNB 701 transmits to the CSG/pico eNB 705 the information on the ABS pattern, pattern 1, pattern 2, and pattern 3 for information of the pattern of subframes explicitly or implicitly (pattern information defined on an X2/S1 interface between eNBs for generating the above patterns but not the explicit pattern information on pattern 1, pattern 2, and pattern 3).

The macro eNB 701 transmits to the CSG/macro eNB 705 the information on the additional power saving indication of the UE (applicable to the first exemplary embodiment) or single or multiple CQI/CSI channel measurement comparison threshold information (applicable to the second exemplary embodiment) along with the pattern information at step 711.

Although not depicted in FIG. 7, it is possible to transmit the information on the pattern to be used as the reference pattern for the additional power saving mode among pattern 1, pattern 2, sub-pattern 1 of pattern 3, and sub-pattern of pattern 3 at step 711.

If the control information is received at step 711, the eNB 705 transmits an acknowledgement (ACK) message notifying of the use of the pattern information and additional power saving mode configuration information at step 721 or negative acknowledgement (NACK) message notifying of the rejection of use of the pattern information and additional power saving mode configuration information at step 731.

At step 731, the NACK message can include the pattern information suggested by the eNB 705 or the information indicating no use of the additional power saving indication or single or multiple CQI/CSI channel measurement comparison threshold values to be used in the additional power saving mode that are suggested by the eNB 705. If the NACK message is received at step 731, the eNB 701 can transmit the pattern information reconfigured based on the information contained in the NACK, information indicating enablement of the additional power saving mode, or single or multiple CQI/CSI channel measurement comparison threshold values at step 741.

Although FIG. 7 illustrates signaling between eNBs, this signaling can be applied between a specific network entity (e.g., an Operation And Management (OAM) server) of the Core Network (CN) and an eNB. For example, the entity 701 can be an OAM server while the entity 705 is a CSG/pico eNB.

Figure 8:
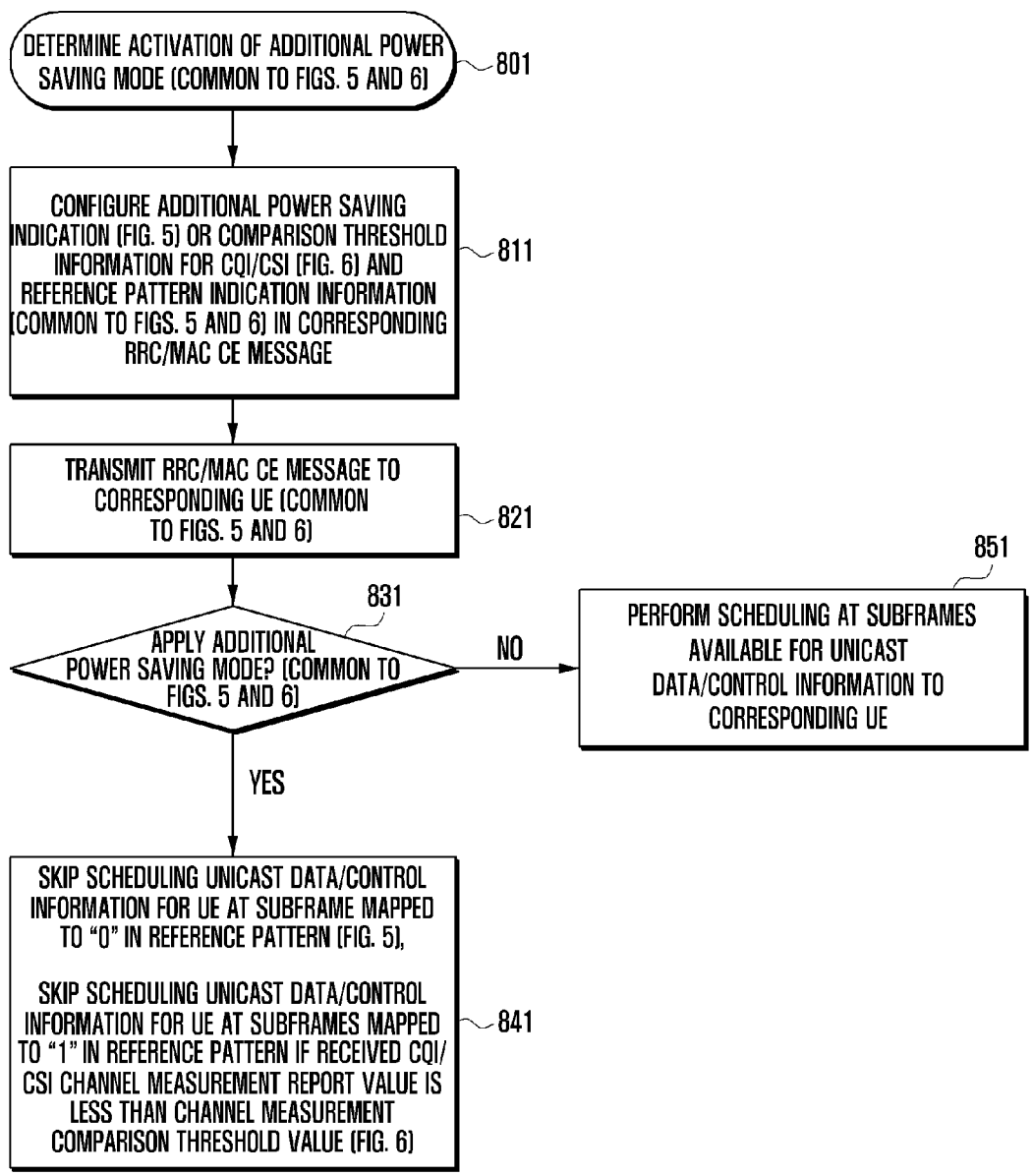
FIG. 8 is a flowchart illustrating an eNB procedure of the power saving method according to the first and second exemplary embodiments of the present invention.

FIG. 8 is a flowchart illustrating an eNB procedure of a power saving method according to the first and second exemplary embodiments of the present invention. More particularly, FIG. 8 shows a procedure in communication between an eNB and a UE (inter-eNB signaling has been described with reference to FIG. 7).

Referring to FIG. 8, it is determined to apply an additional power saving mode at step 801. As such, the serving eNB generates an RRC or MAC CE message including additional power saving mode indicator (applied to the first exemplary embodiment), single or multiple CQI/CSI channel measurement comparison threshold information (applied to the second exemplary embodiment), and reference pattern(s) to be used in the additional power saving mode among patterns 1 and 2 and sub-patterns 1 and 2 of pattern 3 at step 811.

The additional power saving mode determination at step 801 and RRC or MAC CE message generation at step 811 can be performed with the fixed values decided by the operator or based on the information exchanged between eNBs or between a CN node and an eNB as described with reference to FIG. 7.

The serving eNB transmits the RRC/MAC CE generated at step 811 to the UE at step 821 (applied to both the first and second exemplary embodiments). After transmitting the RRC/MAC CE message, the eNB determines whether the UE is recommended to operate in the additional power saving mode (i.e., the additional power saving mode indicator is set to a value enabling the additional power saving mode (e.g., TRUE or "1") at step 811 as in the first exemplary embodiment or single or multiple CQI/CSI channel measurement comparison threshold values are configured for use in the additional power saving mode at step 811 as in the second exemplary embodiment at step 831. If it is determined at step 831 that the UE is recommended to operate in the additional power saving mode, the eNB skips scheduling unicast data/control information for the UE at the subframes mapped to "0" in the reference pattern configured at step 811 in case of the first exemplary embodiment (i.e., the eNB can schedule unicast data/control information for the UE at the subframes mapped to "1" in the reference pattern) and, in case of the second exemplary embodiment, if the CQI/CSI channel measurement report value received from the corresponding UE is less than the CQI/CSI channel measurement comparison threshold value configured at step 811, the eNB skips scheduling unicast data/control information at the subframes mapped to "1" in the reference pattern (i.e., if the CQI/CSI channel measurement report value received from the UE is equal to or greater than the CQI/CSI channel measurement comparison threshold value configured at step 811, the eNB schedules unicast data/control information for the UE at the subframes mapped to "1" in the reference pattern) at step 841.

If it is determined at step 831 that the UE is not recommended to operate in the additional power saving mode, the eNB schedules unicast data/control information for the UE in every subframe without restriction at step 851 (applicable to the exemplary embodiments of FIGS. 5 and 6).

Figure 9:
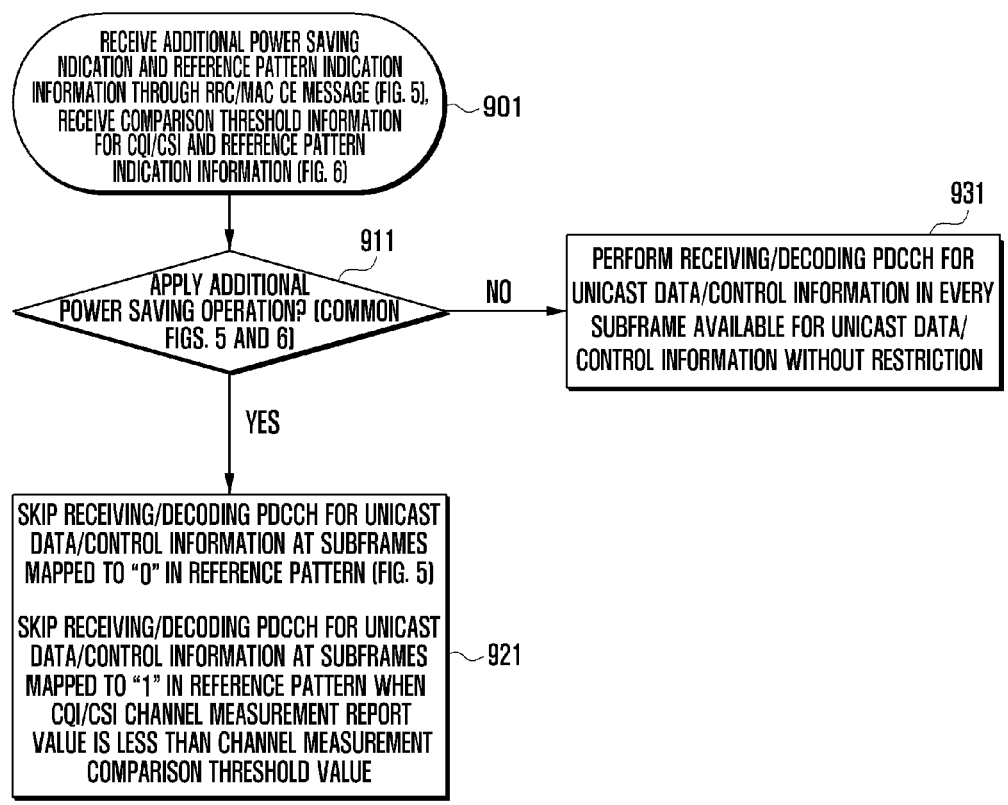
FIG. 9 is a flowchart illustrating a UE procedure of the power saving method according to the first and second exemplary embodiments of the present invention.

FIG. 9 is a flowchart illustrating a UE procedure of a power saving method according to the first and second exemplary embodiments of the present invention.

Referring to FIG. 9, the UE receives the RRC/MAC CE message including additional power saving mode indicator recommending the UE to operate in the additional power saving mode and the information indicating the reference pattern to be used in the additional power saving mode among the patterns 1 and 2 and sub-patterns 1 and 2 of pattern 3 described in the first and second exemplary embodiments (applied to the exemplary embodiment of FIG. 5) or multiple CQI/CSI channel measurement comparison threshold information and reference pattern(s) to be used in the additional power saving mode among patterns 1 and 2 and sub-patterns 1 and 2 of pattern 3 described in the first and second exemplary embodiments at step 901. At step 911, the UE determines whether to operate in the additional power saving mode based on analysis of the received information (applied to the first and second exemplary embodiments). As an example, if the additional power saving mode indicator is set to a value recommending use of the additional power saving mode (e.g. "TRUE" or "1") (applied to the first exemplary embodiment) or single or multiple CQI/CSI channel measurement comparison threshold values are included in the RRC/MAC CE (applied to the second exemplary embodiment), the UE determines to operate in the additional power saving mode at step 911.

If it is determined to operate in the additional power saving mode, the UE skips receiving/decoding PDCCH for unicast data/control information at the subframes mapped to "0" in the reference pattern indicated at step 901 (applied to the first exemplary embodiment) (i.e., the UE receives/decodes PDCCH for unicast data/control information at the subframes mapped to "1" in the reference pattern) and, if the CQI/CSI channel measurement report value is less than the CQI/CSI channel measurement comparison threshold value, skips receiving/decoding PDCCH for unicast data/control information at the subframes mapped to "1" in the reference pattern (applied to the second exemplary embodiment) (i.e., the UE receives/decodes PDCCH for unicast data/control information at the subframes mapped to "1" in the reference pattern only when the CQI/CSI channel measurement report value is equal to or greater than the CQI/CSI channel measurement comparison threshold value received at step 901) at step 921. If it is determined not to operate in the additional power saving mode based on the information received at step 901, the UE can receive/decode PDCCH for unicast data/control information at every subframe available for the unicast data/ control information without restriction at step 931 (applied to the exemplary embodiments of FIGS. 5 and 6).

In case that the UE is operating in Discontinuous Reception (DRX) mode, there is a need of defining additional operations in association with power saving methods according to the first and second exemplary embodiments. The 3GPP standards specify the DRX operation for a UE's power saving such that the UE operating in DRX mode performs receiving/decoding PDCCH for unicast data/control information at the subframes while a predetermined timer is running and skips receiving/decoding PDCCH for unicast data/control information at the subframes while the timer is not running (e.g., when the timer has not started or has expired).

Figure 10:
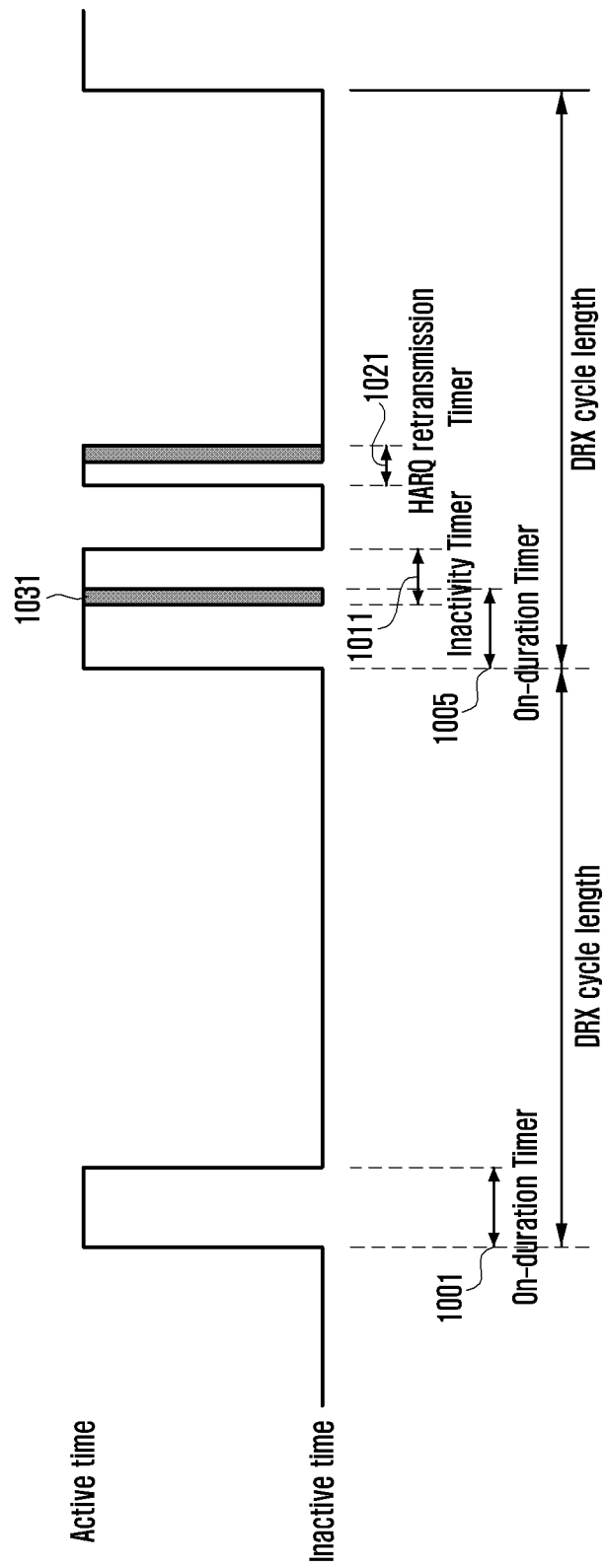
FIG. 10 is a diagram illustrating a principle of Discontinuous Reception (DRX) operation of a UE in a power serving method according to an exemplary embodiment of the present invention.

FIG. 10 is a diagram illustrating a principle of a DRX operation of a UE in a power serving method according to an exemplary embodiment of the present invention.

Referring to FIG. 10, a case where three timers are running to define active time is illustrated. The active time is the duration for which the timer is running such that the UE receives/decodes PDCCH for unicast data/control information at every subframe. In contrast, the inactive time is the duration for which the timer is not running such that the UE skips receiving/decoding PDCCH for unicast data/control information at every subframe. The DRX operation repeats with DRX cycle length (defined as number of subframes or time duration) such that the UE starts an on-duration timer (defined as number of subframes or time duration) at the start time of the DRX cycle. During the time when the on-duration timer is running 1001 and 1005, the UE performs receiving/decoding PDCCH channel for unicast data/control information at every subframe. If no scheduling information for new unicast data/control information (i.e., scheduling information for initial unicast data/control information) is received on PDCCH before the expiry of the on-duration timer 1001, the inactive timer and HARQ retransmission timer do not start and, in this case, the interval between the time point when the on-duration timer expires and the time point when the on-duration timer restarts for the next DRX cycle is regarded as an inactive duration for which the UE skips receiving/decoding PDCCH for unicast data/control information at every subframe. If the scheduling information of new unicast data/control information (i.e., scheduling information for initial unicast data/control information) is received on PDCCH before the expiry of the on-duration timer 1001, the inactive timer starts. For the time duration 1011 while the inactive timer is running, the UE performs receiving/decoding PDCCH for unicast data/control information at every subframe. Although not depicted in FIG. 10, if other scheduling information for new unicast data/control information is received while the inactivity timer is running, the inactivity timer reinitialized. If other timers (on-duration timer and HARQ retransmission tier) are not running when the inactivity timer expires, the UE skips receiving/decoding PDCCH for unicast data/control information. If the scheduled unicast data/control information is missing for the inactive duration, the UE has to receive retransmission for the missed packet 1031 and, in this case, the HARQ retransmission timer starts after a predetermined time (HARQ RRT time) since the time corresponding to 1031 and thus the UE performs receiving/decoding PDCCH channel for the retransmission of the packet 1031 while the HARQ retransmission timer 1021 is running. In brief, when the UE is operating in DRX mode, the active duration for receiving/decoding PDCCH for unicast data/control information is restricted to the duration while the on-duration timer, inactivity timer, or the HARQ retransmit timer is running. The DRX configuration information on whether the DRX is activated, lengths of the timers related to DRX, and DRX cycle length and start time can be transmitted to the UE through RRC signaling.

Figure 11:
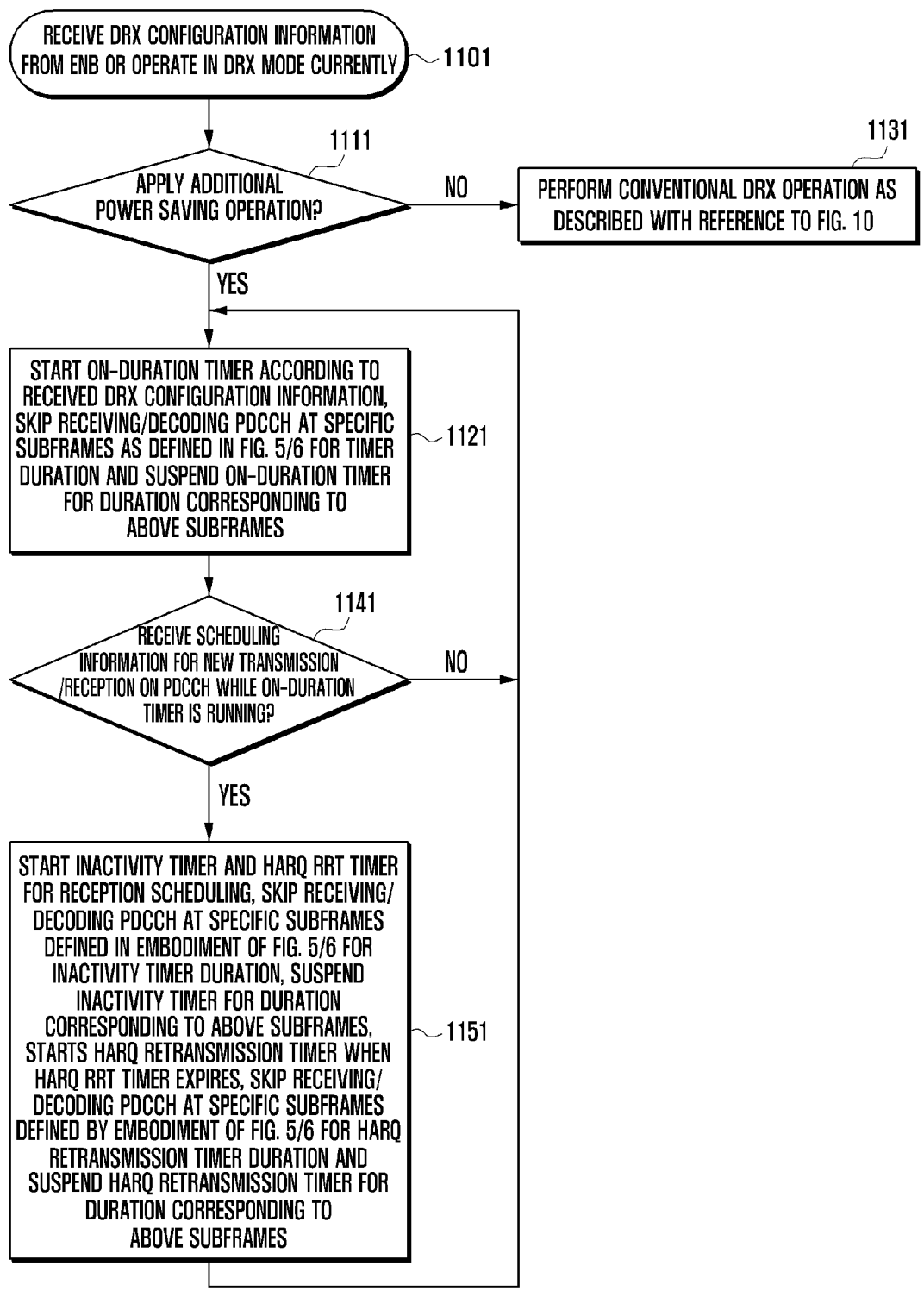
FIG. 11 is a flowchart illustrating a UE procedure for DRX operation in the power saving method according to the first and second exemplary embodiments of the present invention.

FIG. 11 is a flowchart illustrating a UE procedure for DRX operation in a power saving method according to the first and second exemplary embodiments of the present invention.

Referring to FIG. 11, the UE activates DRX mode in response to the receipt of the DRX configuration information or maintains an already activated DRX mode at step 1101. The UE determines whether the additional power saving mode is activated according to one of the first and second exemplary embodiments at step 1111. If it is determined in step 1111 that the additional power saving mode according to one of the first and second exemplary embodiments is activated, the UE starts the on-duration timer at the start point of each DRX cycle according to the received DRX configuration information and skips receiving/decoding PDCCH for unicast data/control information at the subframes as indicated according to one of the first and second exemplary embodiments even when the timer is running, suspending the on-duration timer temporarily at the subframes, and resumes the timer at other subframes at step 1121.

This is intended to exclude the subframes at which the PDCCH reception/decoding is skipped according to one of the first and second exemplary embodiments such that the UE performs receiving/decoding PDCCH for unicast data/control information at the subframes corresponding to the duration in which the timer is running. Otherwise, if the procedure according to one of the first and second exemplary embodiments is applied, the number of subframes at which the UE can receive the unicast data/control information decreases, resulting in degradation of the eNB's scheduling flexibility.

If it is determined in step 1111 that the additional power saving mode according to one of the first and second exemplary embodiments is not activated, the UE operates in DRX operation as described with reference to FIG. 10 at step 1131.

If the scheduling information for new unicast data/control information is received while the on-duration timer is running at step 1141, the UE starts the inactivity timer and, if necessary (e.g., if it is necessary for the eNB to retransmit the packet since the unicast data/control information has not been received successfully), the HARQ RTT timer at step 1151. The HARQ RTT timer is the timer defining the HARQ RTT time as described with reference to FIG. 10. If the HARQ RTT timer expires, the HARQ retransmission timer starts. Even in the duration when the inactivity timer or HARQ retransmission timer is running, the UE skips receiving/decoding PDCCH for unicast data/control information at specific subframes indicated according to one of the first and second exemplary embodiments and suspends the inactivity timer or HARQ retransmission timer for the durations corresponding to the subframes temporarily and resumes the timer for the durations corresponding to the other subframes. This is intended to exclude the subframes at which the PDCCH reception/decoding is skipped according to one of the first and second exemplary embodiments such that the UE performs receiving/decoding PDCCH for unicast data/control information at the subframes corresponding to the duration in which the inactivity timer or the HARQ retransmission timer described with reference to FIG. 10 is running.

Otherwise, if the procedure according to one of the first and second exemplary embodiments is applied, the number of subframes at which the UE can receive the unicast data/control information decreases, resulting in degradation of eNB's scheduling flexibility.

Figure 12:
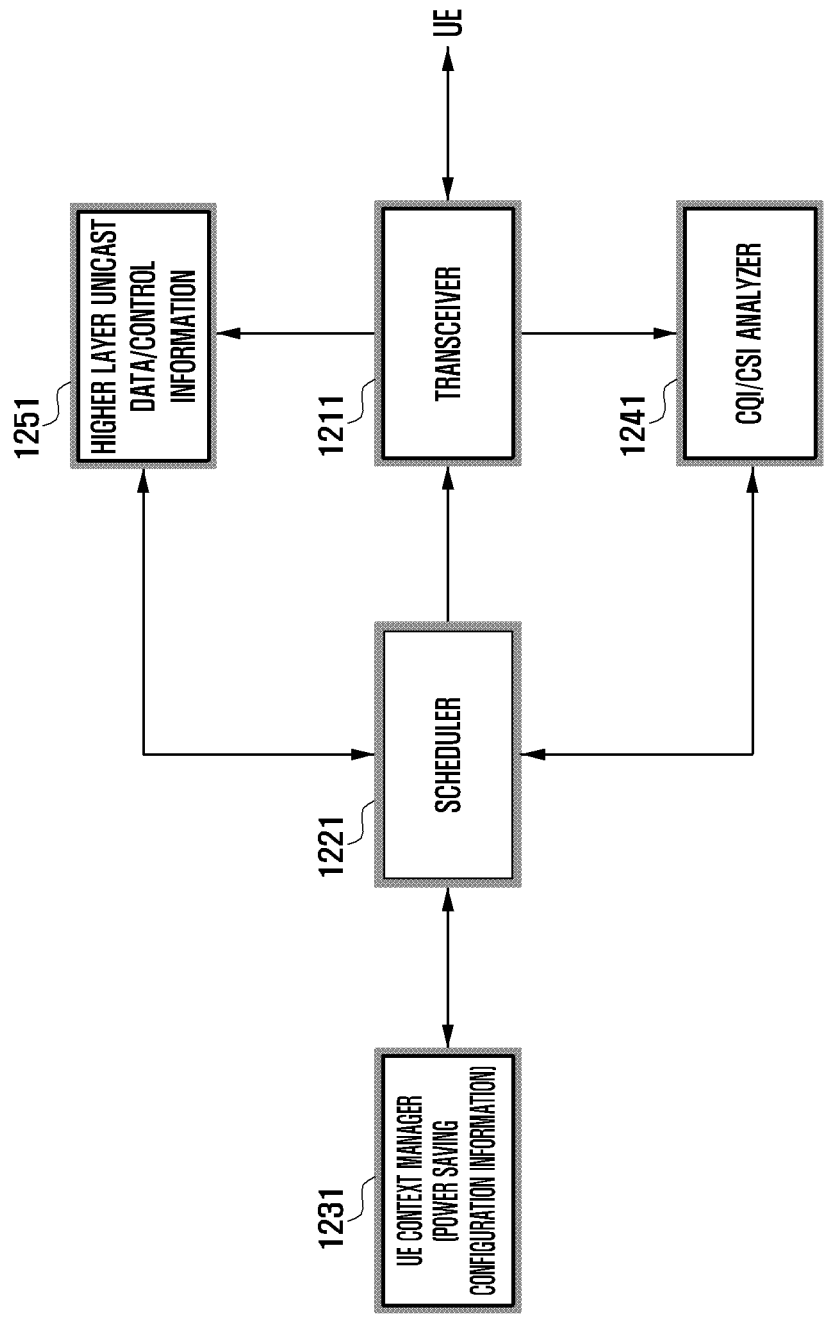
FIG. 12 is a block diagram illustrating a configuration of the eNB according to one of the first and second exemplary embodiments of the present invention.

FIG. 12 is a block diagram illustrating a configuration of an eNB according to one of the first and second exemplary embodiments of the present invention.

Referring to FIG. 12, the eNB communicates with a UE by means of a transceiver 1211. The DRX configuration information including the additional power saving mode configuration information according to one of the first and second exemplary embodiments is maintained/managed by a UE context manager 1231, and the unicast data/control information generated by higher layer entities based on the configuration information is scheduled by a scheduler 1221. In the exemplary embodiment of FIG. 6, the CQI/CSI report received from the UE by means of the transceiver 1211 is used as scheduling decision factor of the scheduler. The eNB further includes a CQI/CSI analyzer 1241 for analyzing CQI/CSI information as well as a higher layer unicast data/control information unit 1251 for evaluating unicast data/control information.

Figure 13:
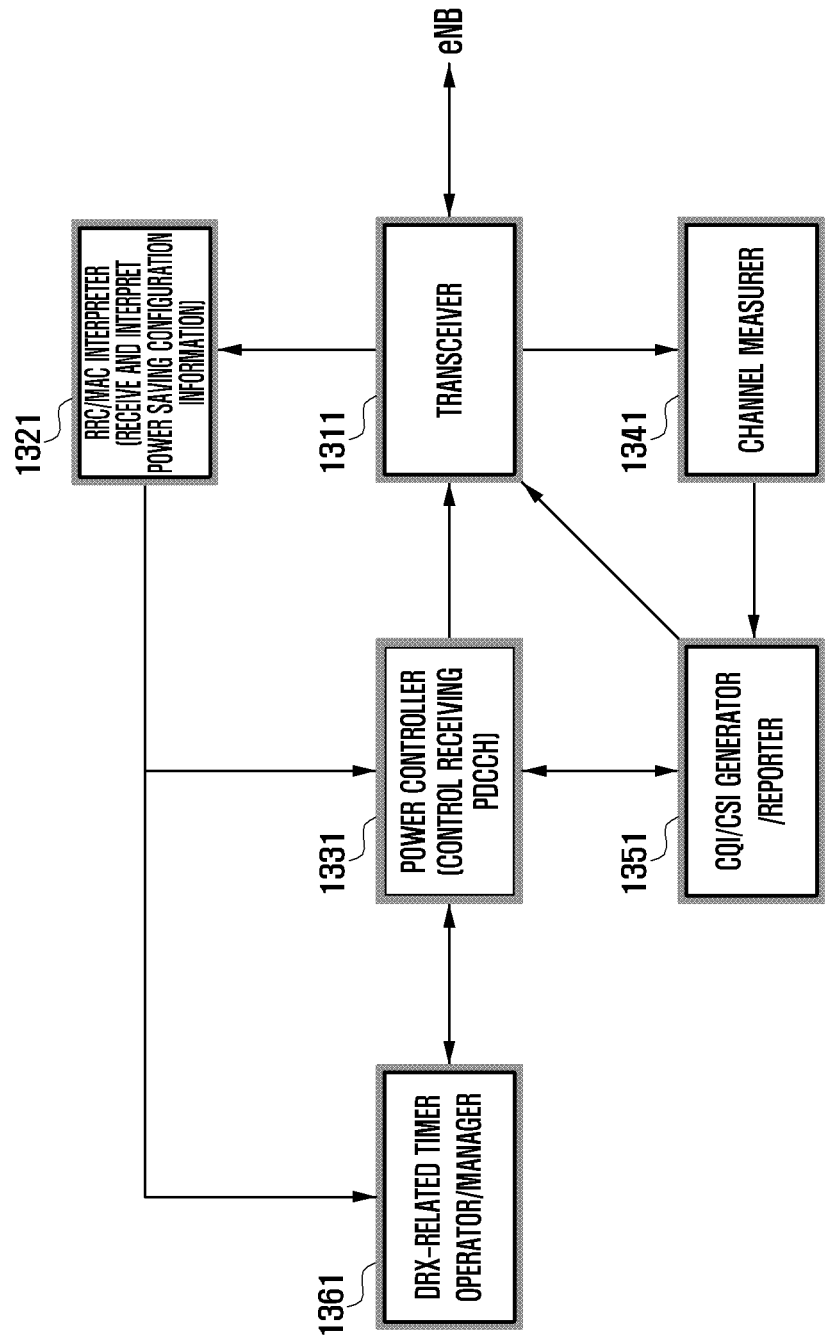
FIG. 13 is a block diagram illustrating a configuration of a UE according to one of the first and second exemplary embodiments of the present invention.

FIG. 13 is a block diagram illustrating a configuration of a UE according to one of the first and second exemplary embodiments of the present invention.

Referring to FIG. 13, the UE communicates with an eNB by means of a transceiver 1311. The DRX configuration information including the additional power saving mode configuration information according to one of the first and second exemplary embodiments is received by means of the transceiver 1311 and interpreted by means of an RRC/MAC interpreter 1321 so as to be used by a power controller 1331 to control receiving/decoding PDCCH per subframe. If the UE is operating in DRX mode, a DRX-related timer operator/manager 1361 controls starting/suspending/resuming/terminating of the related timer. In the exemplary embodiment of FIG. 6, a CQI/CSI generator/reporter 1351 generates and reports the CQI/CSI value based on the channel measurement values measured by a channel measurer 1341, and the reported CQI/CSI channel measurement value is used as power saving control factor of the power controller 1331.

In more detail, the power controller 1331 receives the control information including reference pattern information for use in the UE's power saving mode from the eNB, determines whether the UE is configured to operate in the power saving mode, and performs, when the UE operates in the power saving mode, receiving/decoding the downlink control channel based on the reference pattern information.

According to the first exemplary embodiment of the present invention, the control information can further include the power saving mode activation indication information. In this case, the power controller 1331 controls such that the UE performs receiving/decoding the downlink control channel at a time corresponding to an ABS in the reference pattern. The power controller 1331 also controls such that the UE skips receiving/decoding the downlink control channel at a time not corresponding to ABS in the reference pattern. The power controller 1331 is characterized by skipping receipt of the unicast data or control information from the eNB at a time not corresponding ABS in the reference pattern.

According to the second exemplary embodiment of the present invention, the control information can further include at least one comparison threshold value. In this case, the power controller 1331 compares the channel measurement value reported to the eNB with the threshold value. If the channel measurement value is less than the threshold value, the power controller 1331 skips receiving or decoding the downlink control channel at ABS. if the channel measurement value is equal to or greater than the threshold value, the power controller 1331 performs receiving or decoding the downlink control channel at ABS.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A power saving method of a terminal in a wireless communication system in which transmit power control is performed in units of subframe, the method comprising:
receiving, by a transceiver, control information including a reference pattern for a power saving mode from a base station;
determining, by a controller, whether the terminal is configured to operate in the power saving mode; and
determining, by the controller, when the terminal is configured to operate in the power saving mode, whether to decode a downlink control channel according to the reference pattern,
wherein the reference pattern comprises Almost Blank Subframe (ABS) pattern information.

2. The power saving method of claim 1, wherein the control information comprises a power saving mode activation indicator.

3. The power saving method of claim 1 wherein the determining of whether to decode the downlink control channel comprises receiving or decoding the downlink control channel at a time corresponding to an Almost Blank Subframe (ABS) in the reference pattern.

4. The power saving method of claim 2, wherein the determining of whether to decode the downlink control channel comprises skipping receiving/decoding of the downlink control channel at a time corresponding to a subframe which is not an Almost Blank Subframe (ABS) in the reference pattern.

5. The power saving method of claim 2, further comprising skipping receiving of unicast data or control information from the base station at a time corresponding to an Almost Blank Subframe (ABS) in the reference pattern.

6. The power saving method of claim 1, wherein the control information comprises at least one comparison threshold value.

7. The power saving method of claim 6, wherein the determining of whether to decode the downlink control channel comprises:
comparing a channel measurement value transmitted to the base station with the threshold value; and
skipping, when the channel measurement value is less than the threshold value, receiving or decoding of the downlink control channel at an Almost Blank Subframe (ABS) in the reference pattern.

8. The power saving method of claim 7, wherein the determining of whether to decode the downlink control channel comprises performing, when the channel measurement value is equal to or greater than the threshold value, the receiving or decoding of the downlink channel in the ABS.

9. The power saving method of claim 1, wherein the reference pattern is configured in a bitmap format.

10. A terminal of a wireless communication system in which transmit power of the terminal is controlled in units of subframe, the terminal comprising:
a transceiver for transmitting and receiving signals respectively to and from a base station; and
a power controller for controlling reception of control information including a reference pattern for a power saving mode from a base station, for determining whether the terminal is configured to operate in the power saving mode, and for determining, when the terminal is configured to operate in the power saving mode, whether to decode downlink control channel according to the reference pattern, wherein the reference pattern comprises Almost Blank Subframe (ABS) pattern information.

11. The terminal of claim 10, wherein the control information comprises a power saving mode activation indicator.

12. The terminal of claim 10, wherein the power controller controls receiving or decoding of the downlink control channel at a time corresponding to an Almost Blank Subframe (ABS) in the reference pattern.

13. The terminal of claim 11, wherein the power controller controls to skip receiving/decoding of the downlink control channel at a time corresponding to a subframe which is not an Almost Blank Subframe (ABS) in the reference pattern.

14. The terminal of claim 11, wherein the power controller controls to skip receiving of unicast data or control information from the base station at a time corresponding an Almost Blank Subframe (ABS) in the reference pattern.

15. The terminal of claim 10, wherein the control information comprises at least one comparison threshold value.

16. The terminal of claim 15, wherein the power controller controls to compare a channel measurement value transmitted to the base station with the threshold value and skip, when the channel measurement value is less than the threshold value, receiving or decoding of the downlink control channel at an Almost Blank Subframe (ABS) in the reference pattern.

17. The terminal of claim 15, wherein the power controller controls to perform, when the channel measurement value is equal to or greater than the threshold value, receiving or decoding of the downlink channel in the ABS.

18. The terminal of claim 10, wherein the reference pattern is configured in a bitmap format.

* * * * *